US007279950B2

(12) United States Patent
Cranford, Jr. et al.

(10) Patent No.: US 7,279,950 B2
(45) Date of Patent: Oct. 9, 2007

(54) METHOD AND SYSTEM FOR HIGH FREQUENCY CLOCK SIGNAL GATING

(75) Inventors: Hayden C. Cranford, Jr., Cary, NC (US); Stacy J. Garvin, Durham, NC (US); Vernon R. Norman, Cary, NC (US); Samuel T. Ray, Morgan Hill, CA (US); Wayne A. Utter, Fuquay-Varina, NC (US)

(73) Assignee: International Business Machines Corporation, Armonk, NY (US)

( * ) Notice: Subject to any disclaimer, the term of this patent is extended or adjusted under 35 U.S.C. 154(b) by 3 days.

(21) Appl. No.: 11/235,758

(22) Filed: Sep. 27, 2005

(65) Prior Publication Data

US 2007/0069793 A1 Mar. 29, 2007

(51) Int. Cl.
*H03K 3/00* (2006.01)
(52) U.S. Cl. ........................... 327/291; 327/299
(58) Field of Classification Search ............. None
See application file for complete search history.

(56) References Cited

U.S. PATENT DOCUMENTS

| 5,808,485 A * | 9/1998 | Goff et al. ............... 327/20 |
| 5,883,529 A | 3/1999 | Kumata et al. .............. 326/93 |
| 6,166,574 A | 12/2000 | Tao ........................... 327/166 |
| 6,184,807 B1 | 2/2001 | El-Kik et al. ................. 341/70 |
| 6,239,626 B1 | 5/2001 | Chesavage .................. 327/99 |
| 6,452,426 B1 | 9/2002 | Tamarapalli et al. ......... 327/99 |
| 6,782,486 B1 | 8/2004 | Miranda et al. ........... 713/601 |
| 7,042,277 B2 * | 5/2006 | Cranford et al. ........... 327/538 |
| 2004/0032282 A1 * | 2/2004 | Lee et al. ..................... 326/39 |
| 2004/0123198 A1 * | 6/2004 | Gschwind .................. 714/726 |
| 2005/0089126 A1 * | 4/2005 | Zerbe et al. ................ 375/353 |
| 2005/0135527 A1 * | 6/2005 | Masui et al. ............... 375/355 |

* cited by examiner

*Primary Examiner*—Quan Tra
*Assistant Examiner*—Khareem E. Almo
(74) *Attorney, Agent, or Firm*—Joscelyn G. Cockburn; Patrick J. Daugherty; Driggs, Hogg & Fry Co., LPA

(57) ABSTRACT

A differential clock signal gating method and system is provided, wherein a clock buffer circuit control path develops a clock gating signal with a timing relationship to a clock signal. The clock gating signal gates a buffer on the clock buffer circuit controlled path in communication with the clock signal responsive to a first clock signal pulse negative half. The buffer provides second and successive clock signal pulses occurring immediately and sequentially after the first clock signal pulse as a buffer clock signal output to a second buffer stage in a second stage clock path, each having the nominal clock amplitude and the nominal clock pulse width of the clock signal without jitter.

12 Claims, 2 Drawing Sheets

METHOD AND SYSTEM FOR HIGH FREQUENCY CLOCK SIGNAL GATING

FIELD OF THE INVENTION

The present invention relates to differential clock signal gating in serial link architecture, and more particularly to synchronism across multiple High Speed SerDes (HSS) cores of very high frequency clocks.

BACKGROUND OF THE INVENTION

High-speed data-communications systems typically incorporate multiple robust (gigabit-rate) serializer/deserializer (SerDes) chips that can send and receive parallel data over a serial link. Jitter is one of the most important issues in the design and operation of high-speed serial links. Although SerDes devices implement a purely digital function—serial data communications—they behave in an analog-like fashion, especially in the low-voltage differential signaling used at 10-Gbits/s speeds. And SerDes receivers and transmitters operate asynchronously: receiver and transmitter system clocks must operate within tolerances specified by the communications standard to which they conform, but they are not locked.

Synchronism across multiple High Speed SerDes (HSS) cores, requires clock signal gating function methods and circuitry. Clock gating in many applications is a necessity, and is typically accomplished by the use of a selector circuit or other switching devices inserted in the clock path, to switch between a "static" differential clock OFF condition and the desired clock. However problems arise through inserting an additional stage in the clock path, which degrades clock path performance and results in lower total system integrity while contributing additional jitter to the clock path.

What is needed is a clock gating method and system for synchronism across multiple High Speed SerDes (HSS) cores of very high frequency clocks that does not contribute to clock path jitter.

SUMMARY OF THE INVENTION

A differential clock signal gating method and system is provided, wherein a clock buffer circuit control path develops a clock gating signal with a timing relationship to a clock signal. The clock gating signal gates a buffer on the clock buffer circuit control path in communication with the clock signal responsive to a first clock signal pulse negative half. The buffer provides second and successive clock signal pulses occurring immediately and sequentially after the first clock signal pulse as a buffer clock signal output to a second buffer stage in a second stage clock path, each having the clock amplitude and the clock pulse width of the clock signal without jitter.

DETAILED DESCRIPTION OF THE PREFERRED EMBODIMENT(S)

Figure 1:
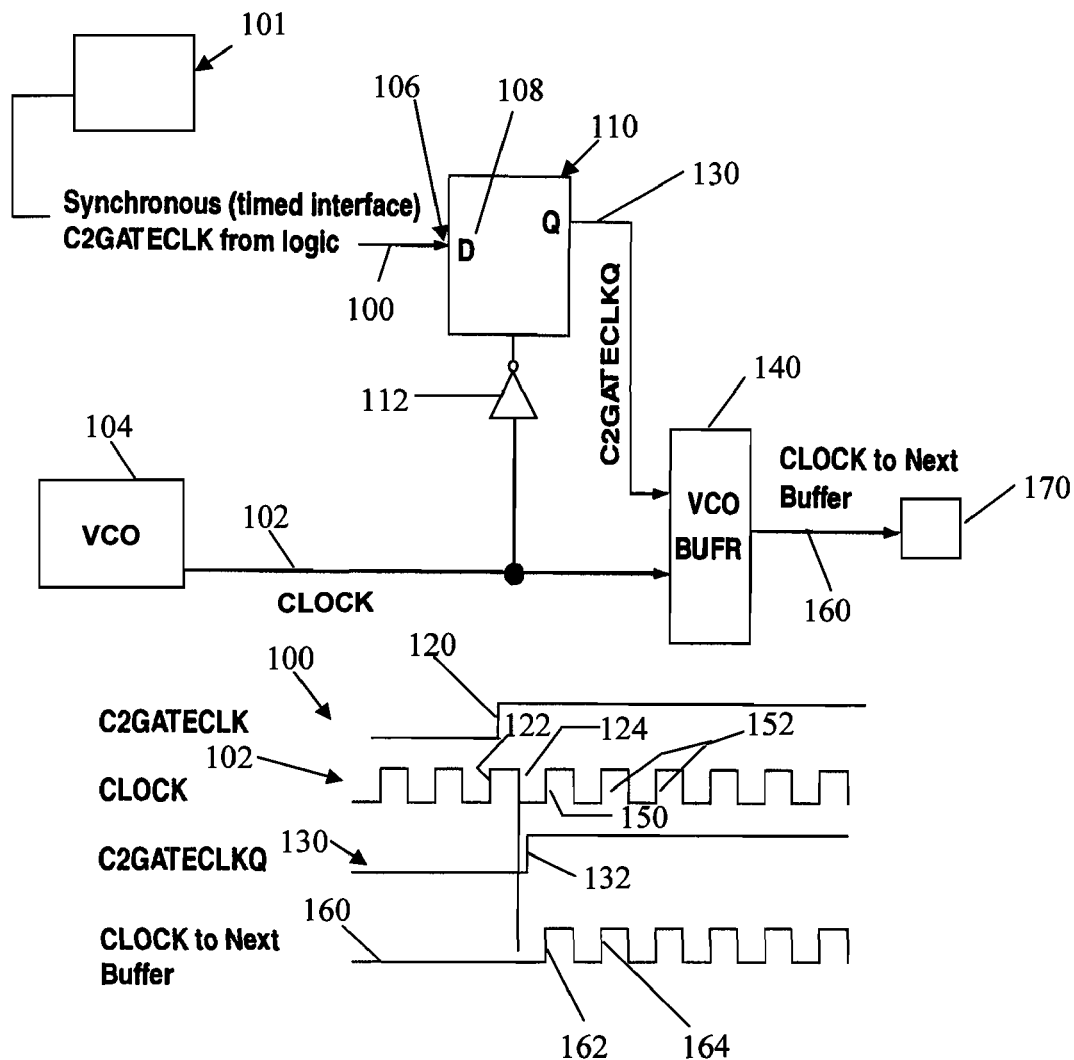
FIG. 1 is a block diagram of a clock gating circuit according to the present invention.

Referring now to FIG. 1, a Clock Gating Block Diagram according to the present invention is illustrated. HSS core 101 logic develops a C2GATECLK signal 100 with correct timing relationship to a CLOCK (differential) signal 102 from a Voltage Controlled Oscillator (VCO) 104. The C2GATECLK 100 is applied to the data input D 106 of a D-type flip flop 108. The CLOCK 102 input to the D type flip flop 110 clocks the input state of the D terminal to the output (Q) when CLOCK 102 changes from positive (high) to negative (low) and therefore on a negative going transition of the CLOCK 102 clocking signal through inverter 112. When C2GATECLK 100 is made active (high) at step 120 by the HSS core 101 logic during the positive half cycle 122 of CLOCK 102, the next negative transition 124 of the CLOCK 102 signal clocks the D type flip flop ON, developing C2GATECLKQ signal 130 positive at step 132, which provides the gating function to a VCO BUFR block 140. With C2GATECLKQ 130 active during the negative portion 124 of the CLOCK signal 102 from the VCO 104 and the VCO BUFR block 140 preset to provide a ZERO output, when C2GATECLK 100 becomes active at step 120, the next positive CLOCK pulse 150 and subsequent CLOCK pulses 152 switch the output of the VCO BUFR block 140 and provide the VCO BUFR output 160 with a full amplitude and positive half cycle clock width and subsequent outputs 162 as the CLOCK 102 signal, which is applied to the input of the next buffer stage 170 in the clock path.

The present embodiment provides a clock gating method that does not require the insertion of switching components in the clock path: rather, the function is applied to the control path of a clock buffer circuit and as a result, does not contribute to clock path jitter. The present embodiment provides a method to meet differential clock signal gating requirement of very high frequency clocks (up to 2.5 GHZ), while contributing zero additional jitter to the clock path, allowing for extremely fast turn-on of the buffer 140.

Figure 2:
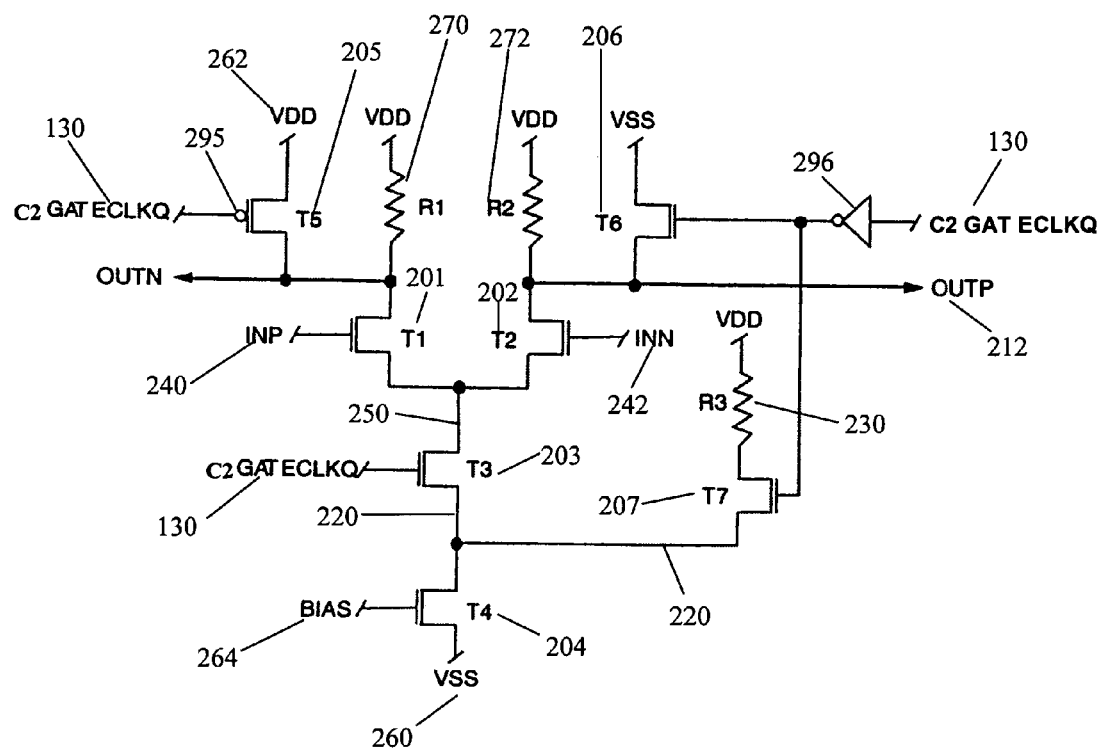
FIG. 2 is a block diagram of a VCO BUFR circuit according to the present invention.

Implementation of the clock gating circuitry involves minimal complexity with only a few additional components for the differential clock buffer control path. FIG. 2 illustrates an embodiment of VCO BUFR block 140 circuitry according to the present invention. Resistors R1 270 and R2 272, paired transistors T1 201 and T2 202, and differential pair current source transistor T4 204 with bias input 264 define a prior art "differential pair structure" within the VCO BUFR block 140: the functions of these elements within the differential pair structure is well known to one skilled in the art, and it is not believed that they need to be described with particularity. VDD 262 is the most positive voltage used by the circuit, and VSS 260 is the circuit ground potential.

With the C2GATECLKQ signal 130 low (OFF), transistors T5 205 and T6 206 are both conducting relative to inputs VDD 262 and VSS 260, respectively, responsive to the inverted C2GATECLKQ 130 input 295 at T5 205 and inverter 296 signal at T6 206, "pre-setting" the differential output of the VCO BUFR block (OUTN 210 and OUTP 212) to a differential ZERO. The low (OFF) C2GATECLKQ signal 130 cuts off transistor T3 203, with the inverted C2GATECLKQ signal 130 causing transistor T7 207 to conduct the differential pair current 220, otherwise sent through transistor T3 203 to the "dummy" load resistance R3 230.

Inputs INP 240 and INN 242 are ignored since the differential transistor pair T1 201 and T2 202 have no differential pair current supplied by T4 204 and cannot affect the outputs. When C2GATECLKQ 130 becomes active during the negative half 124 of the CLOCK cycle 102, as shown in FIG. 1, T5 205 and T6 206 become cutoff and at this time T7 207 becomes cutoff, removing R3 230 as a load from T4 204 and T3 203 simultaneously becoming active (in the same negative half of the CLOCK signal 124), provides the normal differential pair current 250 to T1 201 and T2 202.

T7 207 switches current to the "dummy" load resistor R3 230, allowing the differential pair current source device T4 204 to pass the normal differential pair current with the buffer outputs in a differential OFF condition. Thus when C2GATECLKQ 130 becomes active, the normal nominal value of differential pair current 250 is available immediately to the differential pair T1 201 and T2 202, rather than the relatively slower turn on and ramp up of a differential pair current device as typically provided by prior art clock gating circuitry, which would take a few CLOCK 102 cycles if T4 204 was simply switched ON from an OFF (cutoff) condition, with no current flowing. In contrast, by accomplishing the switching of the various transistor devices Ti 201 through T7 207 internal to the VCO BUFR 140 during the negative half 124 of the CLOCK signal 102 and thereby turning the VCO BUFR 140 ON, the present embodiment allows the next positive CLOCK 102 pulse 150 and subsequent CLOCK pulses 152 to be available at the differential outputs OUTP 212 and OUTN 210 of the VCO BUFR 140, without distortion of the first positive CLOCK 102 pulse 150 after gating the VCO BUFR 140 ON and with no additional jitter inserted in the clock path.

Thus while the C2b GATECLKQ signal 130 is low (OFF) current flows through a "dummy path" defined from VDD 262 through R3 230, T7 207, and T4 204 to ground VSS 260. As this current flow is already present at the time that Inputs INN 242 and INP 240 begin processing, output distortion and jitter on the outputs OUTN 210 and OUTP 212 by clock gating control circuitry is avoided. Output OUTN 210 is previously preconditioned by a direct tie into VDD 262 conducted through T5 205 responsive to the inverted C2GATECLKQ low (OFF) signal 130, and OUTP 212 is previously preconditioned by a direct tie into VSS 260 conducted through T6 206 responsive to the inverted C2GATECLKQ low (OFF) signal 130.

When C2GATECLKQ signal 130 goes high (ON), both T5 205 and T6 206 are cut off, T7 207 cuts off the dummy load current through current sink R3 230 and T3 203 conducts making the differential pair current 220 available from T4 204 to the differential pair T1 201 and T2 202, all happening during the negative half of the CLOCK signal 102. As T4 204 is conducting full amplitude current with insufficient time to reduce the current flow through the device, the next CLOCK pulse 102 is buffered through the differential pair T1 201 and T2 202 with full amplitude and full pulse width, without introducing jitter in the buffering process.

Prior art clock gating methods include multiplexer structures which introduce one or more additional stages in the signal flow, and each additional stage presents a possible source of jitter introduction in the signal flow. In contrast, the above embodiment does not introduce an additional stage(s) in series with the signal flow.

In the present embodiment the C2GATECLK signal 100 is provided within a timing relationship to the CLOCK signal 102: more particularly, the C2GATECLK signal 100 is timed to go high (ON) with the positive half of a CLOCK signal 102 pulse, and the C2GATECLKQ signal 130 to go high (ON) during the negative half of the CLOCK signal 102, enabling the next CLOCK signal 102 pulse to be buffered fully through the differential pair T1 201 and T2 202. This timing relationship is established in the HSS logic providing the control signal C2GATECLKQ 130.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed is:

1. A differential clock signal gating method, comprising the steps of:
   providing a differential clock signal having a plurality of sequential and equivalent clock pulses, each of the plurality of clock pulses having a clock amplitude and a clock pulse width defined by a positive pulse half and a negative pulse half, the negative pulse half occurring sequentially after the positive pulse half;
   providing a clock buffer circuit control path;
   developing a clock gating signal with a timing relationship to the clock signal;
   providing a buffer differential pair within the control path buffer stage in the clock path, the buffer differential pair further having a differential pair current source device dummy current load;
   sending differential pair current to the dummy current load;
   switching the differential pair current from the dummy current load to the buffer differential pair responsive to the clock gating signal during the first clock signal pulse negative half; and
   the buffer differential pair buffering a buffer clock signal output to a second buffer stage responsive to the step of switching the differential pair current, the buffer clock signal output comprising a second clock signal pulse and successive clock signal pulses occurring immediately and sequentially after the first clock signal pulse, the buffer clock signal output comprising a plurality of sequential and equivalent clock pulses each having the clock amplitude and the clock pulse width.

2. The method of claim 1, further comprising the steps of:
   removing the dummy current load as a load from a differential pair current source device servicing the buffer differential pair responsive to the clock gating signal during the first clock signal pulse negative half; and
   providing normal differential pair current to the buffer differential pair simultaneously with the step of removing the dummy current load.

3. The method of claim 2, further comprising the steps of:
   presetting a positive buffer differential output and a negative buffer differential output to a differential zero; and
   cutting off the positive buffer differential output and negative buffer differential output from the differential zero simultaneously with the steps of removing the dummy current load as a load for the buffer differential pair current source device and providing normal differential pair current to the buffer differential pair responsive to the clock control signal during the first clock signal pulse negative half.

4. A clock gating circuit for synchronism of clock signals, comprising:
   a clock generator configured to generate a differential clock signal having a plurality of sequential and equivalent clock pulses, each of the plurality of clock pulses having a clock amplitude and a clock pulse width defined by a positive pulse half and a negative pulse half, the negative pulse half occurring sequentially after the positive pulse half;

a data device having a clock input in communication with the clock generator differential clock signal, a data input and a data output;

a clock gating device in communication with the data device data input and configured to develop a clock gating signal with a timing relationship to the clock signal;

a buffer in circuit communication with the data device data output and the clock generator differential clock signal;

the buffer comprising buffer differential pair circuitry configured to buffer the clock signal to a buffer output stage; and the buffer differential pair circuitry further comprising a differential pair current source device dummy current load configured to receive buffer differential pair current;

wherein the data device is configured to provide the gating signal as data output to the buffer responsive to a first clock signal pulse negative half; and wherein the buffer is configured to switch differential pair current source current from the dummy current load to the buffer differential pair responsive to the clock gating signal during the first clock signal pulse negative half and buffer a subsequent positive clock signal pulse as a buffered clock signal output at the buffer output stage responsive to switching the differential pair current source current from the dummy current load to the buffer differential pair, the buffered clock signal output having the clock amplitude and the clock pulse width.

5. The clock gating circuit of claim 4, wherein the buffer differential pair circuitry is further configured to:

remove the dummy current load as a load from the differential pair current source device responsive to the clock gating signal during the first clock signal pulse negative half and simultaneously provide normal differential pair current to the buffer differential pair.

6. The clock gating circuit of claim 5, wherein the buffer differential pair circuitry is further configured to preset a positive buffer differential output and a negative buffer differential output to a differential zero; and cut off the positive buffer differential output and negative buffer differential output from the differential zero simultaneously with removing the dummy load current as a load from the buffer differential pair and providing normal differential pair current to the buffer differential pair.

7. A clock gating circuit for synchronism of clock signals, comprising:

a Voltage Controlled Oscillator (VCO) configured to generate a differential clock signal having a plurality of sequential clock pulses, each of the plurality of clock pulses having a clock amplitude, a clock pulse width and defined by a positive pulse half and a negative pulse half, the negative pulse half occurring sequentially after the positive pulse half;

a flip flop having a clock input in inverted circuit communication with the VCO differential clock signal, a data input and a data output;

a High Speed SerDes (HSS) core comprising logic configured to develop a clock gating signal with a correct timing relationship to the differential clock signal, the HSS core gating signal in circuit communication with the flip flop data input;

a buffer block comprising differential pair circuitry, a buffer stage input in circuit communication with the flip flop data output and the VCO differential clock signal and a buffer stage output, the buffer differential pair circuitry configured to buffer the clock signal to the buffer stage output, the buffer block preset to provide a ZERO output;

the buffer differential pair circuitry further having a differential pair current source dummy current load device configured to receive buffer differential pair current source current; and a subsequent buffer stage clock input in circuit communication with the buffer block stage output;

wherein the HSS logic is configured to make the clock gating signal high during a clock signal positive pulse half and the flip flop is configured to toggle ON responsive to a next sequential first clock negative pulse half and clock the HSS clock gating signal input to the flip flop output during the first clock negative pulse half; and wherein the buffer block is configured to switch differential pair current from the dummy current load device to the buffer differential pair responsive to the clock gating signal during the first clock signal pulse negative half, and buffer a next sequential second clock signal pulse and successive clock signal pulses as a buffered clock signal output at the buffer output stage to the subsequent buffer stage responsive to switching the differential pair current source current from the dummy current load device to the buffer differential pair, the buffered clock signal output having the clock amplitude and the clock pulse width.

8. The clock gating circuit of claim 7, wherein the buffer differential pair circuitry is further configured to:

remove the dummy current load as a load from the differential pair current source device responsive to the clock gating signal during the first clock signal pulse negative half and simultaneously provide normal differential pair current to the buffer differential pair.

9. The clock gating circuit of claim 8, wherein the buffer differential pair circuitry is further configured to preset a positive buffer differential output and a negative buffer differential output to a differential zero; and cut off the positive buffer differential output and negative buffer differential output from the differential zero simultaneously with removing the dummy current load as a load from the differential pair current source device and providing normal differential pair current to the buffer differential pair.

10. A clock gating circuit for synchronism of clock signals, comprising:

a Voltage Controlled Oscillator (VCO) configured to generate a differential clock signal having a plurality of sequential clock pulses, each of the plurality of clock pulses having a clock amplitude and a clock pulse width and defined by a positive pulse half and a negative pulse half, the negative pulse half occurring sequentially after the positive pulse half; a flip flop having a clock input in inverted circuit communication with the VCO differential clock signal, a data input and a data output;

a High Speed SerDes (HSS) core comprising logic configured to develop a clock gating signal with a correct timing relationship to the differential clock signal, the HSS core gating signal in circuit communication with the flip flop data input;

buffer block differential pair circuitry in circuit communication with the flip flop data output and the VCO differential clock signal, comprising a first transistor (Ta) configured to conduct a highest circuit positive voltage input to a subsequent buffer stage negative output responsive to an inverted clock gating signal input, and a second transistor (Tb) configured to conduct a circuit ground potential to a subsequent buffer stage positive output responsive to an inverted clock gating signal input, wherein the buffer block is pre-set to provide a ZERO output; and a subsequent buffer stage clock input in circuit communication with the buffer block stage outputs, a buffer block subsequent buffer stage output pre-set to a differential ZERO;

wherein the HSS logic is configured to make the clock gating signal high during a clock positive pulse half, the flip flop is configured to toggle ON responsive to a next sequential first clock signal negative pulse half and clock the HSS clock gating signal input to a flip flop output during the first clock signal negative pulse half, and the buffer block is configured to gate a next sequential second clock signal pulse and successive clock signal pulses to the subsequent buffer stage responsive to the high clock gating signal, wherein each gated signal pulse has the clock pulse amplitude and clock pulse width.

11. The clock gating circuit of claim 10, the buffer block circuitry further comprising:

a third transistor (Tc) cut off from conducting a differential pair current source -current to the buffer differential pair circuitry responsive to a clock gating signal input; and a fourth transistor (Td) conducting the differential pair current source current to a dummy current load device responsive to an inverted clock gating signal input.

12. The clock gating circuit of claim 11, wherein responsive to the clock gating signal becoming active during the first clock signal negative pulse half, the first transistor (Ta), second transistor (Th) and fourth transistor (Td) are configured to become simultaneously cutoff and the third transistor (Tc) to become simultaneously active and remove the dummy current load device as a load and provide a normal nominal source current value immediately to the buffer differential pair circuitry; and wherein the buffer differential pair circuitry is configured to simultaneously conduct clock signal inputs to the buffer output stage responsive to the differential pair source current.

* * * * *